US012454144B2

(12) United States Patent
Wilke et al.

(10) Patent No.: US 12,454,144 B2
(45) Date of Patent: Oct. 28, 2025

(54) HEAT-SENSITIVE RECORDING MATERIAL COMPRISING PHENOL-FREE ORGANIC COLOUR DEVELOPERS

(71) Applicant: Mitsubishi HiTec Paper Europe GmbH, Bielefeld (DE)

(72) Inventors: Nora Wilke, Flensburg (DE); Claas Boxhammer, Herford (DE)

(73) Assignee: Mitsubishi Hitec Paper Europe GmbH, Bielefeld (DE)

( * ) Notice: Subject to any disclaimer, the term of this patent is extended or adjusted under 35 U.S.C. 154(b) by 158 days.

(21) Appl. No.: 17/763,872

(22) PCT Filed: Sep. 24, 2020

(86) PCT No.: PCT/EP2020/076757

§ 371 (c)(1),
(2) Date: Mar. 25, 2022

(87) PCT Pub. No.: WO2021/058661

PCT Pub. Date: Apr. 1, 2021

(65) Prior Publication Data

US 2022/0363924 A1 Nov. 17, 2022

(30) Foreign Application Priority Data

Sep. 27, 2019 (DE) ......................... 102019126220.8

(51) Int. Cl.

*B41M 5/333* (2006.01)
*B41M 5/327* (2006.01)
*B41M 5/337* (2006.01)
*B41M 5/42* (2006.01)

(52) U.S. Cl.

CPC ......... *B41M 5/3333* (2013.01); *B41M 5/3275* (2013.01); *B41M 5/3372* (2013.01); *B41M 5/3375* (2013.01); *B41M 5/42* (2013.01); *B41M 2205/04* (2013.01); *B41M 2205/38* (2013.01); *B41M 2205/40* (2013.01)

(58) Field of Classification Search

CPC .... B41M 5/323; B41M 5/327; B41M 5/3275; B41M 5/3333; B41M 5/3372; B41M 5/3375; B41M 5/42; B41M 2205/04; B41M 2205/38; B41M 2205/40

See application file for complete search history.

(56) References Cited

U.S. PATENT DOCUMENTS

| | | | | |
|---|---|---|---|---|
| 2005/0148467 | A1 | 7/2005 | Makitalo et al. | |
| 2020/0039270 | A1* | 2/2020 | Boxhammer | B41M 5/323 |
| 2020/0039271 | A1* | 2/2020 | Boxhammer | B41M 5/323 |
| 2021/0060994 | A1* | 3/2021 | Kocak | B41M 5/3333 |

FOREIGN PATENT DOCUMENTS

| | | | | |
|---|---|---|---|---|
| DE | 10 2004 004 204 | | 1/2004 | |
| DE | 10 2015 104 306 | | 9/2016 | |
| EP | 2 923 851 | A1 | 9/2015 | |
| EP | 3 263 553 | | 1/2018 | |
| EP | 3 533 619 | | 9/2019 | |
| JP | 2014-218062 | | 11/2014 | |
| WO | WO 2014/143174 | | 9/2014 | |
| WO | WO 2016/136203 | | 9/2016 | |
| WO | WO 2018/065328 | | 4/2018 | |
| WO | WO-2018065330 | A1 * | 4/2018 | B41M 5/323 |
| WO | WO 2018/211063 | | 11/2018 | |
| WO | WO 2019/166608 | | 9/2019 | |
| WO | WO 2021/041600 | A2 | 3/2021 | |
| WO | WO 2021/041600 | A3 | 3/2021 | |

OTHER PUBLICATIONS

Office Action dated Oct. 20, 2023 issued in European Patent Application No. 20780671.2.

* cited by examiner

*Primary Examiner* — Gerard Higgins
(74) *Attorney, Agent, or Firm* — COZEN O'CONNOR

(57) ABSTRACT

A description is given of a heat-sensitive recording material, comprising phenol-free organic color developers, more particularly comprising a color developer mixture comprising phenol-free organic color developers, of a heat-sensitive recording layer and also of a coating composition for producing it, of the use of the heat-sensitive recording material, of the use of an organic color developer of a formula I for improving the resistance of the printed image of a heat-sensitive recording material, and of a method for producing heat-sensitive recording material.

14 Claims, No Drawings

HEAT-SENSITIVE RECORDING MATERIAL COMPRISING PHENOL-FREE ORGANIC COLOUR DEVELOPERS

PRIORITY CLAIM

This is a U.S. national stage of application No. PCT/EP2020/076757 filed on Sep. 24, 2020. Priority is claimed on German application 102019126220.8, filed Sep. 27, 2019, the content of which is incorporated herein by reference.

BACKGROUND OF THE INVENTION

The present invention relates to a heat-sensitive recording material, comprising phenol-free organic color developers, more particularly comprising a color developer mixture comprising phenol-free organic color developers, to a heat-sensitive recording layer and also to a coating composition for producing it, to the use of the heat-sensitive recording material, to the use of an organic color developer of a formula I for improving the resistance of the printed image of a heat-sensitive recording material, and to a method for producing a heat-sensitive recording material.

Heat-sensitive recording materials have been known for many years and are enjoying popularity. One of the reasons for this popularity is that the color-forming components are contained in the recording material itself and it is therefore possible to use printers free from toner cartridges and ink cartridges. Accordingly there is no longer any need to use, stock, change or top up toner or ink cartridges. This innovative technology, accordingly, has become established largely across the board particularly in public transport and in retail.

In the more recent past, however, concerns having increasingly been expressed about the eco-friendliness particularly of certain organic developers or color developers (frequently also referred to as color acceptors), and in some cases, too, of dye precursors with which the color developers react on supply of heat to form a visually perceptible color, and the industry and particularly the trade are following these concerns attentively. In recent times, for instance, among the color developers, the well-known and comprehensively studied components, known in the form of bisphenol-A (i.e., 2,2 bis(4-hydroxyphenyl)propane) and bisphenol-S (i.e., 4,4'-dihydroxydiphenyl sulfone), have found themselves to an increased extent at the focus of the debate. In many cases they are already being replaced now by the substitutes Pergafast 201 (i.e., N-(4-methylphenylsulfonyl)-N'-(3-(4-methylphenylsulfonyloxy)phenyl)urea), “D8” (i.e., 4-hydroxy-4'-isopropoxydiphenyl sulfone), N-[2-(3-phenylureido)phenyl]benzenesulfonamide or N-{2-[(phenyl-carbamoyl)amino]phenyl}benzenesulfonamide.

With the objective of improving heat-sensitive recording materials particularly in the context of their use as entry or lottery tickets, in terms of their resistance to environmental effects such as heat, humidity, and chemicals, there has been continual ongoing development of the underlying chemistry and of the production technology for producing such recording materials.

In order to boost the resistance of a thermal print (i.e., a heat-induced recording) obtainable on a heat-sensitive recording material with respect to water, aqueous alcohol solutions, and plasticizers, the document DE 10 2004 004 204 A1 proposes a heat-sensitive recording material whose heat-sensitive recording layer comprises customary dye precursors and also the combination of a phenolic color developer and a urea-urethane-based color developer.

The document DE 10 2015 104 306 A1 describes a heat-sensitive recording material which comprises a carrier substrate and also a heat-sensitive, color-forming layer comprising at least one color former and at least one phenol-free color developer, the phenol-free color developer used comprising, for example, N-phenyl-N'-[(phenylamino)sulfonyl]urea, N-(4-methylphenyl)-N'-[(4-ethylphenylamino)sulfonyl]urea, N-(4-ethoxycarbonylphenyl)-N'-[(4-ethoxycarbonylphenylamino)sulfonyl]urea, or structurally similar compounds.

The document JP 2014-218062 A describes a heat-sensitive recording material having a heat-sensitive recording layer which comprises at least a leuco dye and a color developer on a carrier. The color developer used comprises a mixture of 4,4'-bis(3-tosylureido)diphenylmethane and N-[2-(3-phenylureido)phenyl]benzenesulfonamide.

The document WO 2016/136203 A1 describes a crystalline form of N-(2-(3-phenylureido)-phenyl)benzenesulfonamide and the use of this crystalline form in a recording material.

Subject matter of the document US 2005/0148467 A1 is a heat-sensitive recording material which in order to form an irreversible printed image comprises at least the components of two color-forming systems, with one system being of the chelate type and the other being a conventional leuco dye system.

The document WO 2018/065328 A1 discloses a heat-sensitive recording material comprising a carrier substrate and a heat-sensitive recording layer, where the heat-sensitive recording layer comprises a color former and a color developer mixture.

The document WO 2019/166608 A1 describes a heat-sensitive recording material and color developers.

There is, however, a continual demand for further and improved heat-sensitive recording materials for a wide variety of different applications; in view of high sales volumes in a dynamic market, it must be possible to produce these materials at low cost and they must therefore possess a simple construction. A further challenge is that in the light of its typical fields of use as a voucher, entry ticket, travel ticket, carpark ticket, and the like, a printed, heat-sensitive recording material is subjected to a host of different environmental influences, such as humidity, temperature extremes and/or chemicals.

For instance, in the course of normal uses, heat-sensitive recording materials can come into contact with a host of different substances that can affect the resistance of the thermal print. These substances, as well as water and organic solvents, also include greases and oils which are contained, for example, in hand care products and which may be transferred to the heat-sensitive recording material when said material is touched. Partly for this reason there is a particular demand for heat-sensitive recording materials which exhibit high resistance toward greases and oils.

As well as the resistance toward chemicals, heat-sensitive recording materials ought also to have a high resistance to thermal effects. On the one hand, the heat-sensitive recording material ought to be able to be printed easily and without excessive energy, so that energy consumption in the case of mobile applications, for example, is low. On the other hand, the printed image ought to last after printing, and the action of heat should cause neither the printed image to fade nor the unprinted background to discolor, resulting in the print no longer being legible. Carpark tickets which, once printed, are displayed behind the windshield and which as a result are subject in the summer to high temperatures and direct incoming solar radiation, in particular, are tickets where the thermal resistance is extremely important.

The long-term resistance of the heat-sensitive recording material is also very important in the case of tickets such as concert tickets or flight tickets, which are frequently produced a long time in advance, or with receipts or proofs of purchase, which are needed as evidence of purchase over a long guarantee period. This is especially so if it is inevitably assumed that the heat-sensitive recording materials may come into contact with humidity, with the recording materials used as a concert ticket, flight ticket or proof of purchase being kept close to the body (in the pants pocket, for example) and consequently coming into possible contact with perspiration, for example, and in these cases it is necessary to ensure that the recording materials remain highly legible even after contact with humidity.

In the past it has emerged that recording materials which comprise N-(4-methylphenylsulfonyl)-N-(3-(4-methylphenylsulfonyloxy)phenyl)urea (i.e., "Pergafast 201") as phenol-free (color) developer do exhibit good resistance to greases and oils, but have a long-term resistance to heat effects, particularly in conjunction with high atmospheric humidity, that is still not satisfactory.

It has also emerged that recording materials which comprise N-[2-(3-phenylureido)phenyl]benzenesulfonamide as phenol-free (color) developer do have good resistance to thermal influences, particularly in conjunction with high atmospheric humidity, but have a sub-optimal resistance toward greases and oils.

There is an ongoing need, therefore, to improve the resistance of the thermal print of heat-sensitive recording materials with respect to a variety of ambient influences.

SUMMARY OF INVENTION

It was a primary object of the present invention, therefore, to provide a heat-sensitive recording material which in the printed state exhibits high resistance toward ambient influences, such as humidity, heat or chemicals.

A further, specific, object of the present invention was to provide a heat-sensitive recording material which exhibits extremely high heat resistance. A heat-sensitive recording material of this kind is at the same time to exhibit resistance to grease or fats that is an improvement on or at least comparable with the corresponding resistance in the prior art.

It has now surprisingly been found that the primary object and also further objects and/or component objects of the present invention are achieved by means of a heat-sensitive recording material comprising:

i) a carrier substrate and ii) a heat-sensitive recording layer, where the heat-sensitive recording layer comprises one or more color formers and at least one organic color developer, where the at least one organic color developer comprises or is a compound of the formula I (I)

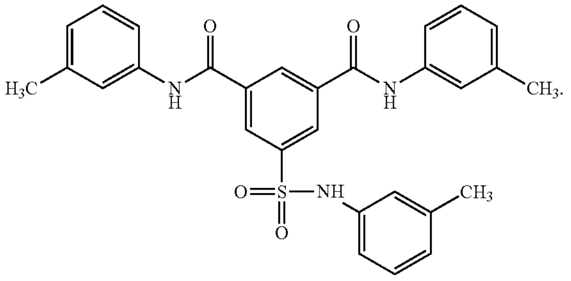

The invention and also inventively preferred combinations of preferred parameters, properties and/or constituents of the present invention are defined in the appended claims. Preferred aspects of the present invention are also indicated or defined in the description hereinafter and also in the examples.

The compound of the formula I, also referred to as 5-(N-3-methylphenylsulfonylamido)(N',N"-bis-(3-methylphenyl))isophthaldiamide, is known per se from document WO 2019/166608 A1, for example, and may be produced by the methods specified therein. The compound of the formula I may be present in multiple different crystalline forms. These different crystalline forms may have different physical properties, which may affect a heat-sensitive recording material which comprises such crystalline forms as color developers. At present there are at least three different crystalline forms of the compound of the formula I known, which are identified as crystalline modification "α", as crystalline modification "β" and as crystalline modification "γ" (cf. WO 2019/166608 A1, page 8, lines 1 to 18 and page 42 lines 24 to 44). The heat-sensitive recording material of the invention may comprise each individual one of these three different crystalline forms of the compound of the formula I in the heat-sensitive recording layer, more particular as component a) of the above-indicted color developer mixture, and also mixtures of these forms. Regarding preferred embodiments, see below.

Preference is given to a heat-sensitive recording material of the invention as described above (preferably a heat-sensitive recording material of the invention that is designated as being preferred in this text), where a further layer, preferably a protective layer, covers all or part of the heat-sensitive recording layer ii);

and/or where the heat-sensitive recording layer ii) comprises one or more color formers and a color developer mixture and where the color developer mixture comprises a) a compound of the formula I as defined above and b) at least one further, preferably one further, organic color developer which contains no phenol group (as a structural constituent of the chemical formula of the one or more further organic color developers), or where the color developer mixture consists of the aforesaid components a) and b).

In in-house experiments it has been found that a heat-resistant recording material of the invention as indicated above, where a further layer, preferably a protective layer, covers all or part of the heat-sensitive recording layer, exhibits particularly good resistance toward chemicals, more particularly toward greases (especially lanolin) and plasticizers. It has also emerged in in-house experiments that a heat-resistant recording material of the invention as indicated above, where a further layer, preferably a protective layer, covers all or part of the heat-sensitive recording layer also exhibits an increased resistance to mechanical effects, especially an increased scratch resistance, and also shows better properties for particular steps of further processing, such as improved capacity for further processing by siliconizing, for instance.

These aforesaid advantages are particularly notable for a heat-resistant recording material of the invention whose heat-sensitive recording layer comprises one or more color formers and as organic color developer only the compound of the formula I (as indicated above or below, or as indicated below as being preferred) and of which all or part, preferably all, is covered with a protective layer, preferably as described below, or with a protective layer described below as being preferred or particularly preferred.

A heat-resistant recording material of the invention whose heat-sensitive recording layer comprises one or more color formers and as organic color developer only the compound of the formula I additionally has the advantage of particularly good heat resistance of the heat-sensitive recording layer (particularly if a further layer, preferably a protective layer, covers all or part of the heat-sensitive recording layer, as described above or below), especially the unprinted background of the heat-sensitive recording layer, enabling prints with an excellent and durable contrast.

Preference is also given to a heat-sensitive recording material of the invention (preferably a heat-sensitive recording material of the invention which is designated as being preferable in this text) comprising i) a carrier substrate and ii) a heat-sensitive recording layer where the heat-sensitive recording layer comprises one or more color formers and as organic color developer a compound of the formula I, preferably only one compound of the formula I (as indicated above or below, or as indicated below as being preferable), and where a further layer, preferably a protective layer, covers all or part, preferably all, of the heat-sensitive recording layer.

As a result of the disposition of a protective layer masking the heat-sensitive recording layer, the heat-sensitive recording layer is also shielded to the outside or to the carrier substrate of the next ply within a roll, and so is protected from external influences.

As well as having the aforesaid positive effects, a protective layer of this kind often also has the desired effect, additionally, of improving the printability of the heat-sensitive recording material, particularly in Indigo, offset and/or flexographic printing. For this reason as well it may be desirable, for certain specific applications, for the heat-sensitive recording material of the invention to have a protective layer as described in this text.

The protective layer for use in the invention of the heat-sensitive recording material of the invention preferably comprises one or more crosslinked or noncrosslinked binders selected from the group consisting of carboxyl group-modified polyvinyl alcohols, silanol group-modified polyvinyl alcohols, diacetone-modified polyvinyl alcohols, acetoacetyl-modified polyvinyl alcohols, partly and fully hydrolyzed polyvinyl alcohols, and film-forming acrylic copolymers, preferably alkylene(meth)acrylic acid copolymers.

To form the protective layer of the heat-sensitive recording material of the invention (where present), the coating composition preferably comprises not only one or more binders (preferably the above-indicated binders which in the coating composition are still present in noncrosslinked form) but also one or more crosslinking agents for the binder or binders. In that case the crosslinking agent is preferably selected from the group consisting of boric acid, polyamines, epoxy resins, dialdehydes, formaldehyde oligomers, epichlorohydrin resins, adipic dihydrazide, melamine-formaldehyde, urea, methylolurea, ammonium zirconium carbonate, polyamidamine-epichlorohydrin resins, and polyamide-epichlorohydrin resins.

DETAILED DESCRIPTION OF THE PRESENTLY PREFERRED EMBODIMENTS

A heat-sensitive recording material of the invention whose protective layer is formed of such a coating composition comprising one or more binders and one or more crosslinking agents for the binder or binders preferably comprises, in the protective layer, one or more binders crosslinked by reaction with one or more crosslinking agents, where the crosslinking agent or agents are preferably selected from the group consisting of boric acid, polyamines, epoxy resins, dialdehydes, formaldehyde oligomers, epichlorohydrin resins, adipic dihydrazide, melamine-formaldehyde, urea, methylolurea, ammonium zirconium carbonate, polyamidamine-epichlorohydrin resins, polyamide-epichlorohydrin resins, and dihydroxybis(ammonium lactato)titanium(IV) Tyzor LA (CAS No. 65104-06-5). “Crosslinked binder” here means the reaction product formed by reaction of a binder with one or more crosslinking agents.

In a first variant embodiment the protective layer masking all or part of the heat-sensitive recording layer is obtainable from a coating composition comprising one or more polyvinyl alcohols and one or more crosslinking agents. The polyvinyl alcohol of the protective layer is preferably modified with acetoacetyl groups, carboxyl groups or silanol groups, more particularly with acetoacetyl groups. Mixtures of different acetoacetyl, carboxyl or silanol group-modified polyvinyl alcohols can also be used preferably in the invention. A protective layer of this kind possesses high affinity for the preferably UV-crosslinking printing ink used in the offset printing process. This provides critical assistance toward meeting the requirement for outstanding printability by offset printing.

The crosslinking agent or agents for the protective layer that are present in the coating composition in accordance with this first variant embodiment are preferably selected from the group consisting of boric acid, polyamines, epoxy resins, dialdehydes, formaldehyde oligomers, polyamidamine-epichlorohydrin resins, polyamine-epichlorohydrin resin, adipic dihydrazide, melamine-formaldehyde, dihydroxybis(ammonium lactato)titanium(IV) Tyzor LA (CAS No. 65104-06-5), sodium glyoxylate, calcium glyoxylate and sodium/calcium glyoxylate. Mixtures of different crosslinking agents are also possible and can be used in the invention.

In the coating composition to form the protective layer in accordance with this first variant embodiment, the mass ratio of the modified polyvinyl alcohol to the crosslinking agent is preferably in a range from 20:1 to 5:1 and more preferably in a range from 12:1 to 7:1.

Particularly preferred is a ratio of the modified polyvinyl alcohol to the crosslinking agent in the range from 100 parts by mass to 8 to 11 parts by mass.

Particularly preferred in the invention is a coating composition for forming the protective layer in accordance with this first variant embodiment, where the coating composition comprises two or more pigments, where one pigment is silica, preferably precipitated silica, and the second pigment or the further pigments are selected from the group consisting of aluminum silicate, aluminum oxide, aluminum hydroxide, barium sulfate, bentonite, boehmite, natural calcium carbonate, precipitated calcium carbonate, diatomaceous earth, urea-formaldehyde resins, natural kaolin, calcined kaolin, kaolinite or calcined kaolinite, kieselguhr, magnesium silicate, magnesium carbonate, satin white, talc, titanium oxide, alumina, activated alumina, and zinc oxide.

It is preferable for the protective layer to be applied, in accordance with this first variant embodiment, with a mass per unit area in a range from 1.0 g/m$^2$ to 6 g/m$^2$ and more preferably from 1.2 g/m$^2$ to 3.8 g/m$^2$. The protective layer in this case is formed preferably as one layer.

In a second variant embodiment, the coating composition to form the protective layer comprises a water-insoluble, self-crosslinking acrylic polymer as binder, a crosslinking agent, and a pigment constituent, where the pigment constituent of the protective layer consists of one or more inorganic pigments and at least 80% by mass is formed of a highly purified, alkali-pretreated bentonite, the binder of the protective layer consists of one or a plurality of water-insoluble, self-crosslinking acrylic polymers, and the binder/pigment (mass) ratio is in a range from 7:1 to 9:1.

A self-crosslinking acrylic polymer within the protective layer, in accordance with the second variant embodiment described here, is preferably selected from the group consisting of styrene-acrylic ester copolymers, copolymers of styrene and acrylic ester that contain acrylamide groups, and copolymers based on acrylonitrile, methacrylamide, and acrylic ester. Copolymers based on acrylonitrile, methacrylamide, and acrylic ester are preferred. The pigment incorporated into the protective layer may be alkali-pretreated bentonite, natural or precipitated calcium carbonate, kaolin, silica, or aluminum hydroxide. Preferred crosslinking agents are selected from the group consisting of cyclic urea, methylolurea, ammonium zirconium carbonate, and polyamide-epichlorohydrin resins.

Through the choice of a water-insoluble, self-crosslinking acrylic polymer as binder and of the mass ratio thereof (i) to the pigment in a range from 7:1 to 9:1 and also (ii) to the crosslinking agent of greater than 5:1, the heat-sensitive recording material of the invention has a high environmental resistance even when a protective layer has a relatively low mass per unit area. Mass ratios as just stated are therefore preferred.

The protective layer itself may be applied using standard coating units, for which it is possible, among others, to utilize a coating composition, preferably with a mass per unit area in a range from 1.0 to 4.5 g/m$^2$.

Particular preference is given in particular to a heat-sensitive recording material of the invention of this kind as described above (preferably a heat-sensitive recording material of the invention that is designated in this text as being preferable) where a further layer, preferably a protective layer, covers all or part of the heat-sensitive recording layer, where the further layer or protective layer comprises:

j) one or more crosslinked or noncrosslinked, preferably crosslinked, modified polyvinyl alcohols, preferably selected from the group consisting of acetoacetyl-modified polyvinyl alcohols, carboxyl group-modified polyvinyl alcohols, silanol group-modified polyvinyl alcohols, and diacetone-modified polyvinyl alcohols, more preferably selected from the group consisting of acetoacetyl-modified polyvinyl alcohols;

jj) one or more alkylene/(meth)acrylic acid copolymers, preferably selected from the group consisting of ethylene/(meth)acrylic acid copolymer, propylene/(meth) acrylic copolymer, butylene/(meth)acrylic copolymer and isobutylene/(meth)acrylic copolymer, more preferably selected from the group consisting of ethylene/(meth)acrylic copolymers, where very preferably the alkylene/(meth)acrylic copolymer is an ethylene/acrylic acid copolymer;

jjj) one, two or more than two pigments, where preferably at least one pigment, two pigments or all the pigments are selected from the group consisting of aluminum silicate, aluminum oxide, aluminum hydroxide, barium sulfate, bentonite, boehmite, natural calcium carbonate, precipitated calcium carbonate, diatomaceous earth, urea-formaldehyde resin, natural kaolin, calcined kaolin, kaolinite, calcined kaolinite, kieselguhr, silica (preferably precipitated silica), magnesium silicate, magnesium carbonate, satin white, silicon oxide, talc, titanium oxide, alumina, activated alumina, and zinc oxide, where more preferably the further layer c) comprises two pigments and where at least one of the two pigments (and where preferably both pigments) is (are) selected from the group consisting of silica (preferably precipitated silica) and kaolin.

The further layer, preferably protective layer, in accordance with the particularly preferred variant, described hereinabove, of the heat-sensitive recording material of the invention, and also the production of this further layer, are described more particularly in document WO 2018/211063 A2, the entire disclosure content of which is hereby incorporated by reference into the present text.

In the preferred variant of the heat-sensitive recording material of the invention where the heat-sensitive recording layer comprises one or more color formers and a color developer mixture and where the color developer mixture comprises as component a) a compound of the formula I and as component b) at least one further organic color developer which contains no phenol group, the color developer mixture comprises, as component b), preferably a substance selected from the group consisting of N-(4-methylphenylsulfonyl)-N'-(3-(4-methylphenylsulfonyloxy)phenyl) urea (Pergafast 201, as described for example in document WO 00/35679 A1; for the chemical structure of Pergafast 201, see below), a compound of the formula II (as described below or as described as being preferable), and mixtures thereof.

For the variant, according to the invention, of the heat-sensitive recording material of the invention which comprises a color developer mixture where the color developer mixture comprises as component a) a compound of the formula I and as component b)N-(4-methylphenylsulfonyl)-N'-(3-(4-methylphenylsulfonyloxy)phenyl)urea (Pergafast 201, see above), it has been found in in-house experiments that through the use of the compound of the formula I it was possible to reduce the fraction of N-(4-methylphenylsulfonyl)-N'-(3-(4-methylphenylsulfonyloxy)phenyl)urea in the heat-sensitive recording material of the invention without any consequent disadvantages with relevance to practical application. Reducing the amount of N-(4-methylphenylsulfonyl)-N'-(3-(4-methylphenyl-sulfonyloxy)phenyl) urea in a heat-sensitive recording material is fundamentally desirable since it enables a reduction, for example, of a potentially harmful effect of N-(4-methylphenylsulfonyl)-

N'-(3-(4-methylphenylsulfonyloxy)phenyl)urea, or products of the breakdown thereof, in wastewaters.

Preference is therefore given to a heat-sensitive recording material of the invention as described above (preferably a heat-sensitive recording material of the invention which is designated in this text as being preferable)

where the heat-sensitive recording layer ii) comprises one or more color formers and a color developer mixture, where the color developer mixture comprises a) a compound of the formula I as described above or below (preferably a crystalline form of the compound of the formula I that is indicated below as being preferable)

and b) (at least one) further organic color developer (which contains no phenol group—as a structural constituent of the chemical formula of the further organic color developer or developers) selected from the group consisting of a compound of the formula II (as described and defined below), N-(4-methylphenylsulfonyl)-N'-(3-(4-methylphenylsulfonyloxy)phenyl)urea (Pergafast 201), and mixtures thereof, or where the color developer mixture consists of the aforesaid components a) and b).

The above-indicated embodiment of the heat-sensitive recording material of the invention here also encompasses the more specific embodiment where the color developer mixture comprises as component b):

b) at least one further, preferably one further, organic color developer which is or comprises a compound N-(4-methylphenylsulfonyl)-N'-(3-(4-methylphenylsulfonyloxy)phenyl)urea (Pergafast 201).

Particular preference is given in particular to a heat-sensitive recording material of the invention as described above (preferably a heat-sensitive recording material of the invention which is designated in this text as being preferable) where the heat-sensitive recording layer ii) comprises one or more color formers and a color developer mixture and where the color developer mixture comprises a) a compound of the formula I as described above or below (preferably a crystalline form of the compound of the formula I that is indicated below as being preferable)

and b) at least one further, preferably one further, organic color developer which is or comprises a compound of the formula II (II)

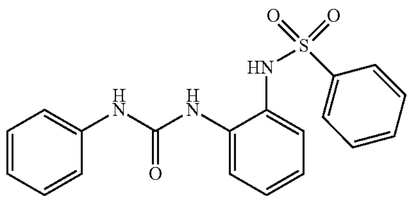

, or where the color developer mixture consists of the aforesaid components a) and b).

The skilled person is aware that the combination of different developers, such as compounds of the formula I or II, leads often (though not in the case of the present invention) to a deterioration in the properties of a heat-sensitive recording material. The reason is that, typically, the combination of two or more color developers leads (but not in the case of the present invention) to an unwanted change in the color of the heat-sensitive recording material, causing the heat-sensitive recording material to have a gray effect, for example, without any improvement in the remaining properties.

The compound of the formula II is the compound known per se, from EP 2 923 851 A1, for example, which is sold under the designation "NKK-1304" (CAS RN for the compound of the formula II not differentiated according to different isomers, 215917-77-4) and which is also identified as N-[2-(3-phenylureido)phenyl]benzenesulfonamide. The compound of the formula II may be present in a number of different crystalline forms. These different crystalline forms may have different physical properties, which may influence a heat-sensitive recording material comprising such crystalline forms as color developers.

At present there are least three different crystalline forms known for the compound of the formula II, as set out in more detail below. The heat-sensitive recording material of the invention may comprise each one of these three different crystalline forms of the compound of the formula II as component b) of the color developer mixture in the heat-sensitive recording layer, and also mixtures of the forms.

The first of these crystalline forms of the compound with the formula II has a melting point of around 158° C. This crystalline form has been described in connection with heat-sensitive recording materials, in, for example, EP 2 923 851 A1.

The second crystalline form of the compound of the formula II has a melting point of around 175° C. The compound of the formula II being the crystalline form having a melting point of 175° C. has been described in, for example, WO 2018/065328 A1.

The third crystalline form of the compound of the formula II has a melting point of around 160° C. to 162° C. and has been described in, for example, EP 3 263 553 A1.

Preferred in the invention is a heat-sensitive recording material where the crystalline form of the compound of the formula II exhibits a (preferably endothermic) transition at a temperature between 170° C. and 178° C. ("second crystalline form of the compound of the formula II"), preferably between 173° C. and 177° C., more preferably between 174° C. and 176° C., determined by means of differential thermal analysis (DTA), also known as differential scanning calorimetry (DSC), at a heating rate of 10 K/min.

At least the first and the second of the abovementioned crystalline forms of the compounds with the formula II may also be differentiated from one another in the IR absorption spectrum. For the crystalline form of the compound of the formula II that is used in the invention, a particular characteristic is an absorption band in the IR spectrum at 3401±20 $cm^{-1}$. The crystalline form of the compound of the formula II that has a melting point of around 158° C. does not have this band, instead having bands at each of 3322 and 3229 $cm^{-1}$.

Also preferred in the invention is a heat-sensitive recording material where the crystalline form of the compound of the formula II in the IR spectrum has absorption bands at 689±10 $cm^{-1}$, 731±10 $cm^{-1}$, 1653±10 $cm^{-1}$ 3364±20 $cm^{-1}$ and 3401±20 $cm^{-1}$ ("second crystalline form of the compound of the formula II").

Preferred in the invention is a heat-sensitive recording material where the IR absorption spectrum of the crystalline form of the compound of the formula II coincides substantially with the IR absorption spectrum depicted in figs 1a), 2a) and/or 3a) of WO 2018/065328 A1 ("second crystalline form of the compound of the formula II").

At least the first and the second of the above-mentioned crystalline forms of the compound of the formula II can likewise be differentiated from one another in the X-ray powder diffractogram or differential diagram. Preferred in the invention is a heat-sensitive recording material where the crystalline form of the compound of the formula II has an X-ray powder diffractogram with reflections at °2θ values of 10.00 0.20, 11.00 0.20, 12.40±0.20, 13.80±0.20 and 15.00±0.20 ("second crystalline form of the compound of the formula II").

Preferred in the invention is a heat-sensitive recording material where the crystalline form of the compound of the formula II has an X-ray powder diffractogram, which coincides substantially with the X-ray powder diffractogram depicted in FIG. 4*b*) of WO 2018/065328 A1 ("second crystalline form of the compound of the formula II").

A compound of the formula II is understood for the purposes of this text preferably to be the crystalline form which in the IR spectrum has an absorption band at 3401±20 $cm^{-1}$ and/or has a melting point of 175° C. and/or exhibits a transition at a temperature between 170° C. and 178° C. (determined by differentiation thermal analysis, with a heating rate of 10 K/min) and/or in the X-ray powder diffractogram has reflections at °2θ values of at least 10.00±0.20, 11.00±0.20, 12.40 0.20, 13.80±0.20 and 15.00±0.20, preferably insofar as the presence of the other crystal structure is not explicitly stated ("second crystalline form of the compound of the formula II").

It is understood that the statement a) of the melting point b) of the reflections in the X-ray powder diffractogram or c) of the absorption bands in the IR spectrum serves merely to describe the crystalline form of a compound specified in this text and so to enable this crystalline form to be distinguished from other crystalline forms of the compound. The statement of one of these parameters is typically sufficient in and of itself to distinguish the different crystalline forms. Particularly preferred in this context, for a compound of the formula II, is the statement of the absorption bands in the IR spectrum, as an IR spectrum can be very easily measured with high reproducibility by the skilled person and IR spectrometers form part of the basic equipment of the chemical laboratory.

Further preferred is a heat-sensitive recording material of the invention as described above (preferably a heat-sensitive recording material of the invention which is designated in this text as being preferable) where the compound of the formula II comprises a crystalline form or where the compound of the formula II is present in a crystalline form (insofar as the heat-sensitive recording layer comprises a color developer mixture, where the color developer mixture comprises not only a compound of the formula I but at least one further organic color developer which is or comprises a compound of the formula II), where preferably the or at least one crystalline form of the compound of the formula II in the IR spectrum has an absorption band of 3401±20 $cm^{-1}$, and/or the compound of the formula I comprises a crystalline form or where the compound of the formula I is present in a crystalline form, where preferably the or at least one crystalline form of the compound of the formula I has a melting point in the range from 195° C. to 217° C., preferably from 200° C. to 215° C., more preferably from 205° C. to 213° C., determined by differential thermal analysis (DTA).

Preference is given to a heat-sensitive recording material of the invention as described above (preferably a heat-sensitive recording material of the invention identified in the text as being preferable) where the compound of the formula I comprises a crystalline form, or where the compound of the formula I is present in a crystalline form, where the crystalline form of the compound of the formula I is the crystalline modification "α" as described in WO 2019/166608 A1, page 8 lines 9-13.

Preference is further given to a heat-sensitive recording material of the invention as described above (preferably a heat-sensitive recording material of the invention identified in the text as being preferable) where the compound of the formula I comprises a crystalline form, or where the compound of the formula I is present in a crystalline form, where the crystalline form of the compound of the formula I has an X-ray powder diffractogram with reflections at °2θ values (+/−0.2°) of 5.5, 6.1, 6.4, 12.1, 16.1, 16.8, 17.1, 18.3, 19.1, 19.9, 20.2, 21.4, 22.1, 22.7, 23.3, 24.3, 24.7, 25.0, 26.4, 27.7 and 29.3.

Preference is given to a heat-sensitive recording material of the invention as described above (preferably a heat-sensitive recording material of the invention identified in the text as being preferable) where the compound of the formula I is present at ≥95 mass %, preferably completely (at 100 mass %), in the form of crystalline modification "α" (as described above), based on the total mass of the compound of the formula I present in the heat-sensitive recording layer.

Preference is given to a heat-sensitive recording material of the invention as described above (preferably a heat-sensitive recording material of the invention which is designated in this text as being preferable) where the heat-sensitive recording layer ii) comprises one or more color formers and a color developer mixture and where the color developer mixture comprises a) a compound of the formula I, preferably a compound of the formula I described in this text as being preferable, more preferably a crystalline modification of the compound of the formula I that is described in this text as being preferable, and b) at least one further organic color developer, preferably a further color developer which is or comprises a compound of the formula II, preferably a preferred compound of the formula II as described in this text, more preferably a crystalline modification of the compound of the formula II that is described in this text as being preferable, or where the color developer mixture consists of the aforesaid components a) and b), where the mass ratio between the compound of the formula II and the compound of the formula I is in the range from ≥5:95 to ≤99.9:0.1, preferably from ≥10:90 to ≤99:1, more preferably from ≥30:70 to ≤99:1 and very preferably from ≥50:50 to ≤98:2 (based in each case on the mass ratio of the compound of the formula II:compound of the formula I).

In in-house experiments it has emerged in particular that a heat-sensitive recording material which in its heat-sensitive recording layer comprises a color developer mixture comprising a compound of the formula I and a compound of the formula II has a higher resistance to grease or fats (particularly to lanolin) than a heat-sensitive recording material which in its heat-sensitive recording layer has, as color developer, either only a compound of the formula I or which has only a compound of the formula II. This result points to a synergistic effect of a color developer mixture comprising a compound of the formula I and a compound of the formula II in terms of increasing the resistance to grease or fats (particular to lanolin), in case relative to the use as color developer of the compound in each case of the formula I alone or of a compound of the formula II alone.

In this way it is possible, for example, to utilize the known advantages of the compound of the formula II as color developer in a heat-sensitive recording material, such as a high sensitivity (print density), and at the same time to achieve a significant improvement in the resistance of the heat-sensitive recording material to grease or fats, if, in the heat-sensitive recording material, the above-stated mass ratio between the compound of the formula II and the compound of the formula I, or an above-stated preferred mass ratio between the compound of the formula II and the compound of the formula I, is observed. More particularly a heat-sensitive recording material in whose heat-sensitive recording layer the compound of the formula II is present in the above-stated mass ratio with respect to the compound of the formula I, more particularly in an above-stated preferred mass ratio, has not only a particularly high resistance to grease or fats but also an excellent sensitivity (dynamic sensitivity or dynamic print density).

The above-described compound N-(4-methylphenylsulfonyl)-N'-(3-(4-methylphenylsulfonyloxy)phenyl)urea (Pergafast 201; CAS No. 232938-43-1) is known per se, from document WO 00/35679 A1, for example, and has the structure of the formula III below:

(III)

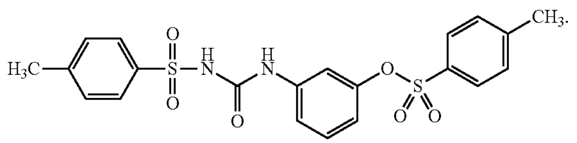

Preference, moreover, is also given to a heat-sensitive recording material of the invention as described above (preferably a heat-sensitive recording material of the invention that is designated in this text as being preferable) where the carrier substrate comprises or is a paper, synthetic paper or a polymeric film and/or the mass fraction of the at least one organic color developer or of the color developer mixture in the heat-sensitive recording layer is 12% to 35%, preferably 15% to 31%, more preferably 17% to 30%, based on the total solids fraction of the heat-sensitive recording layer, and/or the mass per unit area of the heat-sensitive recording layer is in the range from 1.0 to 6 $g/m^2$, preferably in the range from 1.2 to 5.0 $g/m^2$.

Preference is given in the invention to a heat-sensitive recording material where the carrier substrate is a paper, synthetic paper or a polymeric film. A particularly preferred carrier substrate is a coating base paper which has not been surface treated, since such paper has good recyclability and good environmental compatibility. Preferred polymeric films are films of polypropylene or other polyolefins. Also preferred in the invention are papers coated with one or more polyolefins (particularly polypropylene).

Preference is also given to a heat-sensitive recording material of the invention as described above (preferably a heat-sensitive recording material of the invention which is designated in this text as being preferable) further comprising an interlayer disposed between the carrier substrate and the heat-sensitive recording layer, where preferably the interlayer comprises pigments.

It is preferable in the invention if the mass per unit area of the aforesaid interlayer is in the range from 5 to 20 $g/m^2$, preferably in the range from 7 to 12 $g/m^2$.

The pigments (where present) are organic pigments, inorganic pigments, or a mixture of organic pigments and inorganic pigments.

Preference is given to a heat-sensitive recording material of the invention as described above (preferably a heat-sensitive recording material of the invention which is designated in this text as being preferable) where the interlayer comprises pigments and where the pigments comprise:

organic pigments, preferably organic hollow-body pigments;

and/or inorganic pigments, preferably selected from the list consisting of calcined kaolin, silicon oxide, bentonite, calcium carbonate, aluminum oxide, and boehmite.

In-house studies have shown that it is advantageous to incorporate organic pigments into the interlayer, since organic pigments have a high heat reflection capacity. Through enhanced heat reflection on the part of the interlayer embodied with organic pigments, the response of the heat-sensitive recording layer to heat is increased, since the irradiated heat is reflected at least partly into the heat-sensitive recording layer, instead of being conducted onto the carrier substrate. This significantly raises the sensitivity and the resolution of the heat-sensitive recording material and also boosts the printing speed in a thermal printer. It is possible, moreover, to lower the energy consumption during the printing operation, and this is an advantage particularly in the case of mobile devices. Hollow-body pigments have air in their interior, typically giving them an even greater heat reflection and allowing a further increase in the sensitivity and the resolution of the heat-sensitive recording material.

Where inorganic pigments are incorporated into the interlayer situated between the recording layer and the substrate, and particularly the preferred inorganic pigments specified above, these pigments are able to accept those constituents of the heat-sensitive recording layer that are liquefied under the effect of heat from the thermal head (waxes, for example) in the formation of printed characters, and so promote even more reliable and rapid functioning of the heat-induced recording.

It is particularly advantageous if the inorganic pigments of the interlayer (where present) have an oil absorption of at least 80 $cm^3/100$ g and better still of 100 $cm^3/100$ g, determined according to the Japanese standard JIS K 5101. Calcined kaolin has proven particularly appropriate on account of its large absorption reservoir in the hollow spaces. Mixtures of two or more different kinds of inorganic pigments are also conceivable.

Preference is given in the invention to a heat-sensitive recording material where the interlayer comprises optionally further to the organic and/or inorganic pigments at least one binder, based preferably on a synthetic polymer, with styrene-butadiene latex affording particularly good results. The use of a synthetic binder with admixture of at least one natural polymer, such as starch more preferably, represents a particularly suitable embodiment.

Preference is further given to a heat-sensitive recording material of the invention as described above (preferably a heat-sensitive recording material of the invention which is designated in this text as being preferable) where the one or more color formers are selected from those organic compounds which comprise a structural element selected from the group consisting of fluoran, phthalide, lactam, triphenylmethane, phenothiazine, and spiropyran, where preferably the or at least one of the two or more color formers has a fluoran structural element. In-house studies have shown that these color formers exhibit particularly good properties in combination with the color developer mixture used in the invention.

Preference is further given to a heat-sensitive recording material of the invention as described above (preferably a heat-sensitive recording material of the invention which is designated in this text as being preferable) where the one or more color formers comprise one or more compounds (preferably one or more compounds having a fluoran structural element) which are selected from the group consisting of 3-diethylamino-6-methyl-7-anilino fluoran, 3-diethylamino-6-methyl-7-(3'-methylphenylamino)fluoran (6'-(diethylamino)-3'-methyl-2'-(m-tolylamino)-3H-spiro[isobenzofuran-1,9'-xanthen]-3-one; "ODB-7"), 3-di-n-pentylamino-6-methyl-7-anilinofluoran, 3-(diethylamino)-6-methyl-7-(3-methylphenyl-amino)fluoran, 3-di-n-butylamino-7-(2-chloroanilino)fluoran, 3-diethylamino-7-(2-chloroanilino)fluoran, 3-diethylamino-6-methyl-7-xylidinofluoran, 3-diethylamino-7-(2-carbomethoxyphenylamino)fluoran, 3-pyrrolidino-6-methyl-7-anilinofluoran, 3-pyrrolidino-6-methyl-7-(4-n-butylphenylamino)fluoran, 3-piperidino-6-methyl-7-anilinofluoran, 2-anilino-6-dibutylamino-3-methylfluoran (also referred to as "3-N-n-dibutylamine-6-methyl-7-anilinofluoran" or "ODB-2", CAS RN 89331-94-2), 3-(N-methyl-N-cyclohexyl)amino-6-methyl-7-anilinofluoran, 3-(N-methyl-N-propyl)amino-6-methyl-7-anilinofluoran, 3-(N-methyl-N-tetrahydrofurfuryl)amino-6-methyl-7-anilinofluoran), 3-(N-ethyl-N-isoamyl)amino-6-methyl-7-anilinofluoran, 3-(N-ethyl-N-tolyl)amino-6-methyl-7-anilinofluoran, 3-(N-ethyl-N-tetrahydrofuryl)amino-6-methyl-7-anilinofluoran, 3-(N-ethyl-N-isopentylamino)-6-methyl-7-anilinofluoran, 3-(N-ethyl-4-toluidino)-6-methyl-7-(4-toluidino)fluoran, and 3-(N-cyclopentyl-N-ethyl)amino-6-methyl-7-anilinofluoran, where preferably the one or more color formers comprise one or more compounds which are selected from the group consisting of 2-anilino-6-dibutylamino-3-methylfluoran, 3-(N-ethyl-N-isopentylamino)-6-methyl-7-anilinofluoran and mixtures thereof, preferably selected from the group consisting of 2-anilino-6-dibutylamino-3-methylfluoran and 3-(N-ethyl-N-isopentylamino)-6-methyl-7-anilinofluoran.

Likewise preferred are heat-sensitive recording materials of the invention which comprise as color formers the compounds stated in paragraphs [0049] to [0052] of EP 2 923 851 A1.

Preference is given, furthermore, to a heat-sensitive recording material of the invention as described above (preferably a heat-sensitive recording material of the invention which is designated in this text as being preferable) where the heat-sensitive recording layer comprises a binder, preferably a crosslinked or noncrosslinked binder, where preferably the crosslinked or noncrosslinked binder is selected from the group consisting of polyvinyl alcohol, carboxyl group-modified polyvinyl alcohol, acetoacetyl-modified polyvinyl alcohol, ethylene-vinyl alcohol copolymer, a combination of polyvinyl alcohol and ethylene-vinyl alcohol copolymer, silanol group-modified polyvinyl alcohol, diacetone-modified polyvinyl alcohol, and acrylate copolymers.

To form the heat-sensitive recording layer of the heat-sensitive recording material of the invention, the coating composition if desired comprises not only one or more binders but also one or more crosslinking agents for the binder or binders. The crosslinking agent is preferably selected from the group consisting of zirconium carbonate, polyamidamine-epichlorohydrin resins, boric acid, glyoxal, dihydroxybis(ammonium lactato)titanium(IV) (CAS No. 65104-06-5; Tyzor LA), and glyoxal derivates.

A heat-sensitive recording material of the invention whose heat-sensitive recording layer is formed from a coating composition of this kind comprising one or more binders and one or more crosslinking agents for the binder or binders preferably comprises, in the heat-sensitive recording layer, one or more binders crosslinked by reaction with one or more crosslinking agents, where the crosslinking agent or agents are selected from the group consisting of zirconium carbonate, polyamidamineepichlorohydrin resins, boric acid, glyoxal, dihydroxybis(ammonium lactato)titanium(IV) (CAS No. 65104-06-5; Tyzor LA), and glyoxal derivatives. "Crosslinked binder" here refers to the reaction product formed by reaction of a binder with one or more crosslinking agents.

Preference is given in the invention to a heat-sensitive recording material where the heat-sensitive recording layer comprises at least one sensitizer.

When a sensitizer is used, the sensitizer is melted first while heat is supplied during the printing operation, and the melted sensitizer dissolves the color formers and color developers present alongside one another in the heat-sensitive recording layer, and/or lowers the melting temperature of the color formers and color developers, in order to bring about a color development reaction. The sensitizer does not itself take part in the color development reaction.

The term "sensitizer" therefore refers to substances which serve to adjust the melting temperature of the heat-sensitive recording layer and with which it is possible to set a melting temperature, preferably of around 70 to 80° C., without the sensitizers themselves being involved in the color development reaction. Examples of sensitizers which can be used in the invention include fatty acid salts, fatty acid esters and fatty acid amides (e.g., zinc stearate, stearamide, palmitamide, oleinamide, lauramide, ethylene- and methylenebisstearamide, methylolstearamide), naphthalene derivates, biphenyl derivates, phthalates, and terephthalates.

Preference is given to a heat-sensitive recording material of the invention as described above (preferably a heat-sensitive recording material of the invention which is designated in this text as being preferable) where the heat-sensitive recording layer comprises at least one sensitizer, preferably at least one sensitizer having a melting point in the range from 60° C. to 180° C., more preferably having a melting point in the range from 80° C. to 140° C., and/or where the at least one sensitizer is selected from the group consisting of 1,2-bis(3-methylphenoxy)ethane, 1,2-diphenoxyethane, 1,2-di(m-methylphenoxy)ethane, 2-(2H-benzotriazol-2-yl)-p-cresol, 2,2'-bis(4-methoxyphenoxy)diethyl ether, 4,4'-diallyloxydiphenyl sulfone, 4-acetylacetophenone, 4-benzylbiphenyl, acetoacetanilides, benzyl 2-naphthyl ether, benzyl naphthyl ether, benzyl 4-(benzyloxy)benzoate, benzylparaben, bis(4-chlorobenzyl) oxalate, bis(4-methoxyphenyl) ether, dibenzyl oxalate, dibenzyl terephthalate, dimethyl terephthalate, dimethyl sulfone, diphenyl adipate, diphenyl sulfone, ethylenebisstearamide, fatty acid anilides, m-terphenyl, N-hydroxymethylstearamide, N-methylolstearamide, N-stearylurea, N-stearylstearamide, p-benzylbiphenyl, phenyl benzenesulfonate, salicylanilide, stearamide, α,α'-diphenoxyxylene, and mixtures thereof, where more preferably the at least one sensitizer is selected from the group consisting of benzyl naphthyl ether, dimethyl terephthalate, 1,2-di(m-methylphenoxy)ethane, 1,2-diphenoxyethane, and mixtures thereof.

Likewise preferred are heat-sensitive recording materials of the invention which comprise as sensitizer the compounds stated in paragraphs [0059] to [0061] of EP 2 923 851 A1.

Corresponding to a first preferred embodiment according to the invention, these aforementioned sensitizers are used in each case alone, i.e., not in combination with the other stated sensitizers from the list above. Corresponding to a second embodiment according to the invention, at least two (or more) sensitizers selected from the above list are incorporated into the heat-sensitive recording layer.

Additionally, in the heat-sensitive recording materials of the invention, it may optionally prove useful to use 4,4'-diaminodiphenyl sulfone (4,4'-DDS, dapsone) as an additional additive in the heat-sensitive recording layer. The use of 4,4'-diaminodiphenyl sulfone in thermal papers is described for example in WO 2014/143174 A1. The invention may in this case then relate to a heat-sensitive recording material where 4,4'-diaminodiphenyl sulfone is present, in particular additionally as an additive, in the heat-sensitive recording layer.

In heat-sensitive recording materials of the invention it is additionally possible for customary image stabilizers, dispersants, antioxidants, release agents, defoamers, light stabilizers, and brighteners, of the kind known in the prior art, to be used. Each of the components is used customarily in a mass fraction of 0.01 to 15%, more particularly—with the exception of defoamer—0.1 to 15%, preferably 1 to 10%, based on the overall solids fraction of the heat-sensitive recording layer. When defoamers are used in the relevant formulations, the heat-sensitive recording materials of the invention may comprise one or more defoamers in mass fractions of 0.03 to 0.05%, based on the overall solids fraction of the heat-sensitive recording layer.

The present invention also relates, furthermore, to a heat-sensitive recording layer as defined above in this text (i.e., as defined as a constituent of a heat-sensitive recording material of the invention, preferably as a constituent of a heat-sensitive recording material of the invention which is designated in this text as being preferable).

With regard to preferred embodiments of the above-specified heat-sensitive recording layer of the invention and relevant possible combinations with one another of one or more aspects of the invention indicated hereinabove, the explanations given in each case above for the heat-sensitive recording material of the invention are valid correspondingly, and vice versa.

The present invention, then, also relates to a coating composition for producing a heat-sensitive recording layer, comprising the constituents of a heat-sensitive recording layer as defined above in this text (as a constituent of a heat-sensitive recording material of the invention, preferably as a constituent of a heat-sensitive recording material of the invention which is designated in this text as being preferable), and preferably (additionally) a carrier liquid. The carrier liquid serves (as usual in the field of art) preferably to allow the coating composition to be applied, or applied more effectively, on a carrier substrate or on a precoat or interlayer. In a subsequent processing step (e.g., drying) the carrier liquid may be removed again completely or partially.

With regard to preferred embodiments of the above-specified coating composition of the invention for producing a heat-sensitive recording layer and relevant possible combinations with one another of one or more aspects of the invention indicated hereinabove, the explanations given in each case above for the heat-sensitive recording material of the invention and for the heat-sensitive recording layer of the invention are valid correspondingly, and vice versa.

Preference is given to an above-specified coating composition of the invention for producing a heat-sensitive recording layer where the carrier liquid (where present) is selected from the group consisting of water, monohydric alcohols having a total number of carbon atoms in the range from 1 to 6, dihydric alcohols having a total number of carbon atoms in the range from 2 to 6, and mixtures thereof.

Particularly preferred is an above-specified coating composition of the invention for producing a heat-sensitive recording layer where the carrier liquid (where present) comprises or is water, preferably is water.

The term "coating composition" in the context of the present invention and in agreement with the general understanding of the skilled person, particularly the person skilled in the field of paper technology, refers preferably to coating materials, preferably comprising or consisting of pigments—or matrix pigments—binders and (usually) additives, which are applied ("coated") to the surface or a surface of a carrier substrate, preferably to the surface or a surface of a paper substrate (paper surface), or to one or more layers already applied to the surface or a surface of a carrier substrate, preferably to the surface or a surface of a paper substrate, using specific coating apparatuses to finish or modify the surface of the carrier substrate, preferably paper substrate. Recording materials, more particularly papers, produced in this way are also often referred to as "coated papers". Accordingly, in the context of the present invention, the term "coating composition" is the generic term for spreadable coating materials, preparations and/or solutions for the treatment, modification or finishing of a substrate surface, preferably a carrier substrate surface, more preferably a paper substrate surface.

Coating compositions may also further comprise additives typically used in papermaking, such as, for example, biocides, dispersants, release agents, defoamers or thickeners, which are added in order to adjust the properties of the coating composition and which typically remain in the layer produced from the coating composition. Additives typically used in papermaking may be employed here in the customary amounts.

To apply a coating composition to the carrier substrate or to a layer already present on the carrier substrate, the skilled person knows of various coating techniques, examples being blade coating, film press coating, cast coating, curtain coating, knife coating, airbrush coating or spray coating. All of these known coating technologies referred to above are suitable for applying the aforesaid coating composition of the invention to a carrier substrate, preferably a paper substrate, which comprises one or more precoats and/or intermediate coats or else which comprises no precoat and/or intermediate coat.

The present invention also relates to the use of a heat-sensitive recording material of the invention as described above (preferably of a heat-sensitive recording material of the invention which is designated in this text as being preferable) as entry tickets, flight, rail, ship or bus ticket, gaming ticket, carpark ticket, label, till receipt, bank statement, self-adhesive label, medical diagram paper, fax paper, security paper, or barcode labels.

A further aspect of the present invention relates to products, preferably entry tickets, flight, rail, ship or bus ticket, gaming ticket, carpark ticket, label, till receipt, bank statement, self-adhesive label, medical diagram paper, fax paper, security paper, or barcode labels, comprising a heat-sensitive recording material of the invention.

With regard to preferred embodiments of the above-specified inventive use and of the above-specified products of the invention and relevant possible combinations with one another of one or more aspects of the invention indicated hereinabove, the explanations given in each case above for the heat-sensitive recording material of the invention, for the above-specified heat-sensitive recording layer of the invention, and for the above-specified coating composition of the invention for producing a heat-sensitive recording layer are valid correspondingly, and vice versa.

Additionally the present invention likewise relates to the use of a compound of the formula (I)

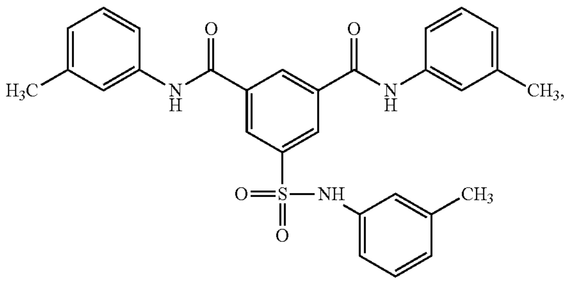

where preferably the compound of the formula I comprises a crystalline form or where the compound of the formula I is present in a crystalline form (preferably comprising the or present in the crystalline modification "α" as described above), where more preferably the or at least one crystalline form of the compound of the formula I (as described above or described above as being preferable) has a melting point in the range from 190° C. to 217° C., preferably from 200° C. to 215° C., more preferably from 205° C. to 213° C., determined by differential thermal analysis (DTA), for improving the resistance of the printed image of a heat-sensitive recording material which comprises a compound of the formula II (II)

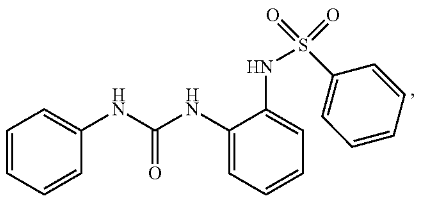

preferably a compound of the formula II in one or more crystalline forms as specified above or specified above as being preferable, to grease (preferably to grease or fats) and/or oil and/or lanolin, where preferably the compound of the formula I and the compound of the formula II are present (preferably together) in a heat-sensitive recording layer of the heat-sensitive recording material, preferably in a mass ratio of the compound of the formula II to the compound of the formula I in the range from ≥5:95 to ≤99.9:0.1, more preferably from ≥10:90 to ≤99:1, very preferably from ≥30:70 to ≤98:2, and more preferably still from ≥50:50 to ≤98:2.

With regard to preferred embodiments of the above-specified inventive use of a compound of the formula I and relevant possible combinations with one another of one or more aspects of the invention specified hereinabove, the explanations given above in each case for the heat-sensitive recording material of the invention, for the above-specified heat-sensitive recording layer of the invention, for the above-specified coating composition of the invention for producing a heat-sensitive recording layer, for the above-specified inventive use of the recording material of the invention, and for the above-specified products of the invention are valid correspondingly, and vice versa.

Likewise the present invention also relates to a method for producing a heat-sensitive recording material, preferably for producing a heat-sensitive recording material of the invention as described above (preferably of a heat-sensitive recording material of the invention which is designated in this text as being preferable), at least comprising the following steps:

i. providing or producing a carrier substrate;

ii. providing or producing a coating composition comprising a compound of the formula I as defined above or as defined above as being preferable;

iii. providing or producing a coating composition comprising a compound of the formula II as defined above or as defined above as being preferable;
and/or
providing or producing a coating composition comprising N-(4-methylphenylsulfonyl)-N'-(3-(4-methylphenylsulfonyloxy)phenyl)urea;

iv. applying the coating compositions provided or produced in step ii. and in step iii. to the carrier substrate or to an interlayer disposed on the carrier substrate;

v. drying the applied coating compositions to form a heat-sensitive recording layer.

With regard to preferred embodiments of the above-specified method of the invention and relevant possible combinations with one another of one or more aspects of the invention specified hereinabove, the explanations given above in each case for the heat-sensitive recording material of the invention, for the above-specified heat-sensitive recording layer of the invention, for the above-specified coating composition of the invention for producing a heat-sensitive recording layer, for the above-specified inventive use of the recording material of the invention, the above-specified products of the invention, and for the above-specified use according to the invention of a compound of the formula I are valid correspondingly, and vice versa.

In the method of the invention specified above, the coating compositions produced or provided in each case in step ii and in step iii may each be applied individually (separately) in step iv. or it is possible to apply only one coating composition, which comprises both the compound of the formula I and the compound of the formula II, or which comprises both the compound of the formula I and the compound N-(4-methylphenylsulfonyl)-N'-(3-(4-methylphenylsulfonyloxy)phenyl)urea, or which comprises both the compound of the formula I and the compound of the formula II and the compound N-(4-methylphenylsulfonyl)-N'-(3-(4-methylphenylsulfonyloxy)phenyl)urea. In the context of the present invention it is preferable in step iv. of the above-specified method of the invention to apply only one coating composition which comprises both the compound of the formula I and the compound of the formula II and which (if a compound N-(4-methylphenylsulfonyl)-N'-(3-(4-methylphenylsulfonyloxy)phenyl)urea is present or is used) also comprises the compound N-(4-methylphenylsulfonyl)-N'-(3-(4-methylphenylsulfonyloxy)phenyl)urea. Particularly preferred is an above-described method of the invention where the aforesaid steps ii. and/or iii. are realized by the provision or production of an above-specified coating composition of the invention (or a coating composition of the invention that is described in this text as being preferable).

Preference is given to a method of the invention as described above (preferably a method of the invention which is designated in this text as being preferable), further comprising the method steps of a) providing or producing a coating composition comprising pigments;
b) applying the provided or produced coating composition on the carrier substrate;
c) drying the applied coating composition, to form an interlayer;

where preferably the method steps a) to c) are carried out before the above-specified method step ii. and where preferably the interlayer is disposed between the carrier substrate and the heat-sensitive recording layer. Where an interlayer is formed, the applying of the provided or produced coating composition in step iii. of the method of the invention takes place onto the resultant interlayer and not directly onto the provided or produced carrier substrate.

Preference, moreover, is also given to a method of the invention as described above (preferably a method of the invention which is designated in this text as being preferable), further comprising the method steps of A) providing or producing a coating composition;
B) applying the provided or produced coating composition on the heat-sensitive recording layer;
C) drying the applied coating composition, to form a protective layer;

where preferably the method steps A) to C) are carried out after the above-specified method step iv. and the protective layer is disposed on the heat-sensitive recording layer.

EXAMPLES

The examples given below are intended to explain and describe the invention in more detail, without limiting its scope.

In papermaking a distinction is made between three levels for the dry solids content of paper and pulp: "bone dry" (absolutely dry), "air dry", and "oven dry". In the examples given below, unless otherwise indicated, these are each reported as "% bone dry", "% air dry", and "% oven dry". Here, "bone dry" represents a paper or pulp with 0% water content. The basis used for the calculation for "air dry" is a "standard" moisture content (that which is basically necessary for the paper). In the case of chemical and mechanical pulp, the calculation mass is based in general on 90:100, i.e. 90 parts of pulp and 10 parts of water. The condition of paper or pulp after drying under specified, defined conditions is referred to as "oven dry".

The compound of the formula I used in the examples below was the "α" crystalline modification of the compound of the formula I.

The compound of the formula II used in the examples below was the above-detailed, "second crystalline form of the compound of the formula II".

Example 1: Production of a Paper Web with Interlayer as Carrier Substrate

On a Fourdrinier paper machine, a paper web as carrier substrate is produced from bleached and ground hardwood and softwood pulps with a mass per unit area of 67 $g/m^2$, with addition of customary adjuvants in customary amounts. On the front side, using a roller knife coating unit, an interlayer comprising hollow-space pigments and calcined kaolin as pigment, styrene-butadiene latex as binder and starch as cobinder is applied with a mass per unit area of 9 $g/m^2$, and conventionally dried.

Example 2: Production of Coating Compositions for Heat-Sensitive Recording Layers The formulation used for the coating composition for producing heat-sensitive recording layers was in each case a formulation comprising as binder a mixture comprising polyvinyl alcohol and an acrylate copolymer, and calcium carbonate as pigment. Further constituents of the respective coating composition for producing the heat-sensitive recording layers are specified in table 1 below:

TABLE 1

Constituents of the coating composition for heat-sensitive recording layers

| Coating composition | Compound formula (I)* bone dry mass fraction [%] (% fraction CDM) | Compound formula (II) bone dry mass fraction [%] (% fraction CDM) | ODB-2 Bone dry mass fraction [%] |
|---|---|---|---|
| I1 | 21.7 (100) | 0 (0) | 9.3 |
| I2 | 1.1 (5) | 20.6 (95) | 9.3 |
| I3 | 2.2 (10) | 19.5 (90) | 9.3 |
| I4 | 6.5 (30) | 15.2 (70) | 9.3 |
| I5 | 10.85 (50) | 10.85 (50) | 9.3 |
| I6 | 15.2 (70) | 6.5 (30) | 9.3 |
| I7 | 19.5 (90) | 2.2 (10) | 9.3 |
| I8 | 20.6 (95) | 1.1 (5) | 9.3 |
| C1 | 0 (0) | 21.7 (100) | 9.3 |
| C2 | P201:21.7 (100) | 0 (0) | 9.3 |

The "bone dry mass fraction [%]" specified in table 1 above refers in each case to the mass fractions of the specified components in terms of the total mass of the coating composition.

In table 1 above, the indication "compound formula I*" means that the "bone dry mass fraction [%]" specified in the corresponding column refers in each case to the compound of the formula I (color developer), unless otherwise indicated in the column. In the coating composition "C2" conversely, the compound of the formula I is replaced entirely by Pergafast 201.

In table 1 above, the indication "(% fraction CDM)" denotes the mass fraction of the color developer (in mass %)

indicated in the respective column in terms of the color developer mixture present in the heat-sensitive recording layer.

| | |
|---|---|
| ODB-2: | "one dye black 2"; 2-anilino-6-dibutylamino-3-methylfluoran (IUPAC name: 6'-(dibutylamino)-3'-methyl-2'-(phenylamino)-3H-spiro[2-benzofuran-1,9'-xanthene]-3-one); CAS RN 89331-94-2; (color former). |
| P201: | Pergafast 201 (color developer, see above). |

Example 3: Production of Heat-Sensitive Recording Materials

To produce heat-sensitive recording materials, a coating machine was used to apply in each case a coating composition as specified in table 1 above, with a mass per unit area of 2.3 g/m$^2$, to a paper web with interlayer as carrier substrate (for production, see example 1 above), which after application, to form a heat-sensitive recording layer, was in each case conventionally dried and optionally calendered.

In this way the heat-sensitive recording materials HR-I1 to HR-I8 (each inventive) and also HR-C1 and HR-C2 (each comparative) indicated below in table 2 were obtained.

TABLE 2

Heat-sensitive recording materials

| Heat-sensitive recording material | Coating composition | Type |
|---|---|---|
| HR-I1 | I1 | inventive |
| HR-I2 | I2 | inventive |
| HR-I3 | I3 | inventive |
| HR-I4 | I4 | inventive |
| HR-I5 | I5 | inventive |
| HR-I6 | I6 | inventive |
| HR-I7 | I7 | inventive |
| HR-I8 | I8 | inventive |
| HR-C1 | C1 | comparative |
| HR-C2 | C2 | comparative |

Example 4: Production of Heat-Sensitive Recording Materials Covered with a Protective Layer Further heat-sensitive recording materials HR-I1 to HR-I8 (each inventive) and also HR-C1 and HR-C2 (each noninventive, comparative) are produced as indicated in examples 1 to 3 above. Applied to the heat-sensitive recording layers of these further heat-sensitive recording materials HR-I1 to HR-I8 and also HR-C1 and HR-C2, using a roller knife coating facility, is in each case a coating composition for a protective layer, as specified in table 3 below, with a mass per unit area of 1.5 to 2.5 g/m$^2$ in each case, which is subsequently dried.

TABLE 3

Coating composition for a protective layer

| Component function | Constituent | Fraction [w(x) (bone dry)] |
|---|---|---|
| Pigment | Kaolin | 0.30 to 0.40 |
| Pigment | Silica | 0.020 to 0.040 |
| Polyvinyl alcohol | Acetoacetyl-modified PVA (Type 1) | 0.05 to 0.15 |
| Polyvinyl alcohol | Acetoacetyl- modified PVA (Type 2) | 0.20 to 0.50 |

TABLE 3-continued

Coating composition for a protective layer

| Component function | Constituent | Fraction [w(x) (bone dry)] |
|---|---|---|
| Additive | Zinc stearate | 0.05 to 0.07 |
| Crosslinker | Polyamidamine-epichlorohydrin resin | 0.015 to 0.035 |
| Alkylene/(meth)acrylic acid copolymer | Ethylene-acrylic acid copolymer | 0.015 to 0.040 |
| Crosslinker | Sodium/calcium glyoxylate | 0.005 to 0.020 |

In this way the heat-sensitive recording materials HR-I1P to HR-I8P and also HR-C1P and HR-C2P, each covered with a protective layer, are obtained.

Example 5: Determination of the Heat Resistance of Heat-Sensitive Recording Materials For the instrumental capture of the heat resistance of a thermal printout on the heat-sensitive recording material of inventive example HR-I1 (for production see example 3) and of the noninventive, comparative example HR-C2, thermal test printouts with a black/white-checkered design were produced on the respective heat-sensitive recording materials for testing, using a GeBE Printerlab device.

Following the production of the black/white-checkered thermal test printouts, and after a rest time of more than 5 minutes, the print density was determined using a TECHKON® spectroDens Advanced spectral densitometer at in each case three locations on the black-colored areas (denoted "image" in table 4 below) and of the uncolored areas (denoted "background" in table 4 below) of the thermal test printouts. The mean value was formed in each case from the measurement values for the black-colored areas and for the uncolored areas (denoted as "before heating" in table 4 below).

The thermal test printouts were hung in a drying cabinet at 90° C. After 1 hour the thermal paper printouts were removed again and cooled to room temperature, and again the print density was determined at respectively three locations on the black-colored areas and on the uncolored areas of the thermal test printouts (formation of mean value and densitometer as described above; denoted as "after heating" in table 4 below).

The measurement results obtained in this way are listed in table 4 below:

TABLE 4

Print densities of heat-sensitive recording materials before and after heating

| Measurement/value | HR-C2 [print density] | HR-I1 [print density] |
|---|---|---|
| Image before heating | 1.19 | 1.15 |
| Background before heating | 0.06 | 0.06 |
| Contrast before heating | 1.13 | 1.09 |
| Image after heating | 1.09 | 1.05 |
| Background after heating | 0.67 | 0.08 |
| Contrast after heating | 0.42 | 0.97 |
| Resistance [%] | | |
| Image | 92 | 91 |
| Contrast | 37 | 89 |

The data reported above in table 4 show that a heat-sensitive recording material of the invention (HR-I1) exhibits outstanding heat resistance of the background and so enables durable, very high-contrast printouts.

Example 6: Determination of the Dynamic Print Density (or Dynamic Sensitivity) of Heat-Sensitive Recording Materials The sensitivity of a heat-sensitive recording material (particularly of a thermal paper) defines the degree of reaction for a particular supply of energy. It is usually represented in graphs showing the image density or optical density (OD) produced as a function of the heat or energy supplied. The optical density is a measure of the ratio between incident and reflected light. An optical density, reported in optical density units (ODU), of around 1.1 is as a general rule completely black to the human eye. Lower optical densities therefore produce different gray stages. A distinction is made between static and dynamic sensitivity (or static and dynamic print density).

The dynamic sensitivity (or dynamic print density) of a heat-sensitive recording material (particularly of a thermal paper) indicates how rapidly a heat-sensitive recording material can be printed. The higher the dynamic sensitivity, the more rapidly a thermal printer is able to print the heat-sensitive recording material, with settings otherwise unchanged.

In order to determine the maximum dynamic print density of the heat-sensitive recording materials indicted in table 5 below, thermal test printouts each with a black/white-checkered design were produced with a GeBE printer, the heat-sensitive recording materials (cf. table 5) being printed out with an energy in the range from 3 to 16 mJ/mm$^2$. Each thermal test printout was subsequently investigated using a TECHKON® SpectroDens Advanced spectral densitometer. The measurement results obtained with a densitometer (as print density indications in ODU) are reported in table 5 below against the corresponding energy inputs.

TABLE 5

Dynamic sensitivity (print density) of heat-sensitive recording materials

| Heat-sensitive recording | Energy input [mJ/mm$^2$] | | | | | | | | | |
|---|---|---|---|---|---|---|---|---|---|---|
| material | 3.22 | 4.62 | 6.07 | 7.49 | 8.88 | 10.32 | 11.74 | 13.17 | 14.57 | 16.00 |
| HR-C2 (ODU) | 0.08 | 0.17 | 0.37 | 0.64 | 0.83 | 0.94 | 1.04 | 1.08 | 1.09 | 1.07 |
| HR-I1 (ODU) | 0.06 | 0.07 | 0.15 | 0.32 | 0.56 | 0.73 | 0.87 | 0.94 | 0.97 | 0.96 |
| HR-I2 (ODU) | 0.06 | 0.14 | 0.36 | 0.63 | 0.86 | 1.02 | 1.09 | 1.13 | 1.14 | 1.13 |
| HR-I3 (ODU) | 0.06 | 0.12 | 0.28 | 0.58 | 0.80 | 1.00 | 1.10 | 1.16 | 1.15 | 1.19 |
| HR-I4 (ODU) | 0.06 | 0.12 | 0.31 | 0.55 | 0.77 | 0.95 | 1.01 | 1.07 | 1.09 | 1.12 |
| HR-I5 (ODU) | 0.06 | 0.11 | 0.28 | 0.58 | 0.75 | 0.93 | 1.01 | 1.06 | 1.09 | 1.09 |
| HR-I6 (ODU) | 0.06 | 0.09 | 0.26 | 0.48 | 0.68 | 0.87 | 0.95 | 1.03 | 1.04 | 1.04 |
| HR-I7 (ODU) | 0.06 | 0.09 | 0.20 | 0.38 | 0.61 | 0.81 | 0.92 | 0.97 | 1.03 | 1.04 |
| HR-I8 (ODU) | 0.06 | 0.08 | 0.17 | 0.36 | 0.57 | 0.76 | 0.90 | 0.97 | 0.97 | 1.01 |

From the data reported in table 5 above it can be seen that the inventive heat-sensitive recording materials HR-I2, HR-I3, HR-I4 and HR-I5 (containing between 5 and 50 mass fractions of compound of the formula I in terms of the color developer mixture present in each case in the heat-sensitive recording layer) had at least approximately the same values of dynamic sensitivity as or higher values of dynamic sensitivity than the noninventive heat-sensitive recording material HR-C2 employed for the purpose of comparison (containing only the conventional color developer Pergafast 201). Said data also show that, in the comparison, the highest (maximum) values for print density were achieved with the inventive heat-sensitive recording materials which had only a relatively low fraction of compound of the formula I in the color developer mixture present in each case in the heat-sensitive recording layer.

Example 7: Resistance of Heat-Sensitive Recording Materials to Grease or Fats The heat-sensitive recording materials employed for this test were in each case those listed in table 6 below:

Lanolin (wool wax) was applied to printed areas of heat-sensitive recording materials, produced using a GeBE printer at maximum printing energy (+1 setting), and the excess was dabbed off with a filter paper or cotton cloth after an exposure time of 10 minutes. The test sheets thus pretreated were subsequently stored for 24 hours under ambient conditions (23° C., 50% relative humidity). Before the lanolin was applied (“before”) and after the end of the storage time (“after”), the TECHKON® SpectroDens Advanced spectral densitometer was used to determine in each case the optical density (in ODU) of the printed areas “before” and “after” and also, as “stability”, the fraction (in %) of optical density still remaining after the end of the storage time (“after”), relative to the initial value (“before”). The corresponding values are reported in table 6 below:

TABLE 6

| Lanolin resistance of heat-sensitive recording materials | | | |
|---|---|---|---|
| Heat-sensitive recording material | ODU "before" | ODU "after" | Stability [%] |
| HR-C1 | 1.18 | 0.15 | 12.7 |
| HR-C2 | 1.11 | 0.66 | 59.3 |
| HR-I1 | 1.03 | 0.47 | 45.5 |
| HR-I2 | 1.19 | 0.71 | 59.8 |
| HR-I3 | 1.12 | 0.65 | 58.0 |
| HR-I4 | 1.14 | 0.66 | 57.6 |
| HR-I5 | 1.13 | 0.61 | 54.1 |
| HR-I6 | 1.10 | 0.59 | 53.6 |
| HR-I7 | 1.06 | 0.51 | 48.3 |
| HR-I8 | 1.04 | 0.49 | 47.3 |

From the data reported in table 6 above it can be seen that the grease or fats resistance of a heat-sensitive recording material containing only a compound of the formula II as color developer in the heat-sensitive recording layer can be increased significantly by admixing even just a small amount of compound of the formula I, so that in the heat-sensitive recording layer there is, or there is formed, a color developer mixture comprising a compound of the formula I and a compound of the formula II.

Relative, also, to a heat-sensitive recording material which contains only a compound of the formula I as color developer in the heat-sensitive recording layer, the resistance to grease or fats can be significantly increased again by admixing rising amounts of compound of the formula II, so that a color developer mixture comprising a compound of the formula I and a compound of the formula II is formed or is present in the heat-sensitive recording layer.

Accordingly, a heat-sensitive recording material which in its heat-sensitive recording layer comprises a color developer mixture comprising a compound of the formula I and a compound of the formula II has a higher resistance to grease or fats (particularly to lanolin) than heat-sensitive recording materials which in their heat-sensitive recording layers have as color developer either only a compound of the formula I or which have only a compound of the formula II. This suggests a synergistic effect of a color developer mixture comprising a compound of the formula I and a compound of the formula II in terms of increasing the resistance to grease or fats (particularly to lanolin).

The resistance of a heat-sensitive recording material to lanolin is regarded here as higher if the print density of a printed region decreases to less of an extent than for the comparative specimen.

Example 8: Determination of the Long-Term Climatic Resistance of Heat-Sensitive Recording Materials (at 60° C. and 90% rh)

For the instrumental capture of the climatic resistance of a thermal printout on the heat-sensitive recording materials of inventive examples and of comparative examples (production in each case as described in example 3), thermal test printouts with a black/white-checkered design were produced on the respective heat-sensitive recording materials for testing, using a GeBE Printerlab device, employing a thermal head with a resolution of 300 dpi and an energy per unit area of 16 mJ/$mm^2$.

Following the production of the black/white-checkered thermal test printout, and after a rest time of more than 5 minutes, the print density was determined using a TECHKON® spectroDens Advanced spectral densitometer at in each case three locations on the black-colored areas of the thermal test printout. The mean value was formed in each case from the respective measurement values for the black-colored areas.

For each of the inventive examples indicated below in table 7 and for each comparative example indicated there, the following procedure was then performed: a thermal test printout was hung in a drying cabinet at 60° C. and a relative humidity of 90%. After 1, 2, 3, 7, 11, 18 and 39 days, the thermal paper printout was removed and cooled to room temperature and again the optical print density (in ODU) was determined using a TECHKON® SpectroDens Advanced spectral densitometer at in each case three locations on the black-colored areas of the thermal test printout. From the respective measurement values for black-colored areas, the mean value was formed in each case. Following each measurement, and prior to the next measurement, the thermal test printout was hung in the drying cabinet again at 60° C. and a relative humidity of 90%.

The measurement results thus obtained are reported below in table 7:

TABLE 7

| Long-term climatic resistance of heat-sensitive recording materials | | | | | | | | |
|---|---|---|---|---|---|---|---|---|
| Heat-sensitive recording | Days from start of test | | | | | | | |
| material | 0 | 1 | 2 | 3 | 7 | 11 | 18 | 39 |
| HR-C1 (ODU) | 1.17 | 1.11 | 1.07 | 1.03 | 0.91 | 0.83 | 0.75 | 0.67 |
| HR-C2 (ODU) | 0.94 | 0.85 | 0.84 | 0.81 | 0.74 | 0.67 | 0.60 | 0.53 |
| HR-I1 (ODU) | 1.00 | 0.92 | 0.91 | 0.91 | 0.87 | 0.86 | 0.84 | 0.84 |
| HR-I2 (ODU) | 1.17 | 1.12 | 1.10 | 1.07 | 1.00 | 0.95 | 0.88 | 0.80 |
| HR-I3 (ODU) | 1.14 | 1.10 | 1.08 | 1.05 | 0.98 | 0.93 | 0.87 | 0.81 |
| HR-I4 (ODU) | 1.11 | 1.06 | 1.04 | 1.02 | 0.96 | 0.94 | 0.89 | 0.85 |
| HR-I5 (ODU) | 1.10 | 1.03 | 1.01 | 0.99 | 0.95 | 0.91 | 0.88 | 0.84 |
| HR-I6 (ODU) | 1.10 | 1.04 | 1.02 | 1.01 | 0.97 | 0.94 | 0.92 | 0.89 |
| HR-I7 (ODU) | 1.12 | 1.03 | 1.02 | 1.01 | 0.97 | 0.96 | 0.94 | 0.93 |
| HR-I8 (ODU) | 1.02 | 0.94 | 0.92 | 0.91 | 0.87 | 0.86 | 0.84 | 0.84 |

From the measurement results reproduced in table 7 it can be seen that the printouts (measured in units of optical print density) on all inventive heat-sensitive recording materials were more resistant to hot, humid climatic influences than the printouts on comparative heat-sensitive recording materials which as color developer contained either only Pergafast 201 or only a compound of the formula II (NKK 1304).

It is also apparent from the measurement results reproduced in table 7 that the addition even of small amounts of a compound of the formula I to a compound of the formula II (NKK 1304) causes the resultant color developer mixture to endow a heat-sensitive recording material with significantly better long-term resistance to hot, humid climatic influences.

Particularly preferred inventive heat-sensitive recording materials in accordance with table 7 also exhibit an improved long-term resistance to hot, humid climatic influences in comparison to heat-sensitive recording materials which as color developer contain only a compound of the formula I or only a compound of the formula II, and this underscores the corresponding synergistic effect of a color developer mixture comprising a compound of the formula I and a compound of the formula II.

The invention claimed is:

1. A heat-sensitive recording material comprising:

i) a carrier substrate and ii) a heat-sensitive recording layer, where the heat-sensitive recording layer comprises one or more color formers and a color developer mixture where the color developer mixture comprises a) a compound of the formula I (I)

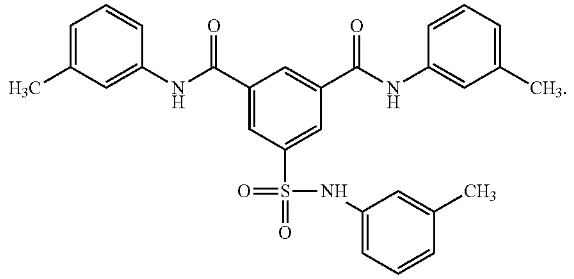

and b) at least one further organic color developer which is or comprises a compound of the formula II (II)

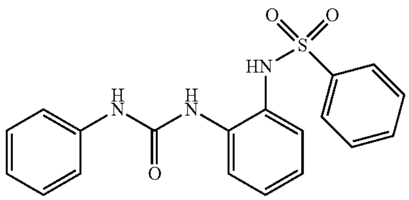

, where the mass ratio between the compound of the formula II and the compound of formula I is in the range from >90:10 to ≤98:2.

2. The heat-sensitive recording material as claimed in claim 1, where a further layer covers all or part of the heat-sensitive recording layer.

3. The heat-sensitive recording material as claimed in claim 1, where the compound of the formula I comprises a crystalline form or where the compound of the formula I is present in a crystalline form.

4. The heat-sensitive recording material as claimed in claim 3, where the compound of the formula II comprises a crystalline form or where the compound of the formula II is present in a crystalline form, where the crystalline form of the compound of the formula II in the IR spectrum has an absorption band at 3401±20 cm−1, and/or the compound of the formula I comprises a crystalline form or where the compound of the formula I is present in a crystalline form, where the crystalline form of the compound of the formula I has a melting point in the range from 195° C. to 217° C., determined by differential thermal analysis.

5. The heat-sensitive recording material as claimed in claim 1, where the carrier substrate comprises or is a paper, synthetic paper or a polymeric film and/or the mass fraction of the color developer mixture in the heat-sensitive recording layer is 12% to 35% based on the total solids fraction of the heat-sensitive recording layer, and/or the mass per unit area of the heat-sensitive recording layer is in the range from 1.0 to 6 $g/m^2$.

6. The heat-sensitive recording material as claimed in claim 1, further comprising an interlayer disposed between the carrier substrate and the heat-sensitive recording layer, where the interlayer comprises pigments.

7. The heat-sensitive recording material as claimed in claim 6, where the interlayer comprises pigments and where the pigments comprise organic pigments, comprising organic hollow-body pigments;

and/or inorganic pigments, selected from the list consisting of calcined kaolin, silicon oxide, bentonite, calcium carbonate, aluminum oxide, and boehmite.

8. The heat-sensitive recording material as claimed in claim 1, where the one or more color formers are selected from organic compounds which comprise a structural element selected from the group consisting of fluoran, phthalide, lactam, triphenylmethane, phenothiazine, and spiropyran.

9. The heat-sensitive recording material as claimed in claim 1, where the heat-sensitive recording layer comprises a crosslinked or noncrosslinked binder, where the crosslinked or noncrosslinked binder is selected from the group consisting of polyvinyl alcohol, carboxyl group-modified polyvinyl alcohol, acetoacetyl-modified polyvinyl alcohol, ethylene-vinyl alcohol copolymer, a combination of polyvinyl alcohol and ethylene-vinyl alcohol copolymer, silanol group-modified polyvinyl alcohol, diacetone-modified polyvinyl alcohol, and acrylate copolymers.

10. The heat-sensitive recording material as claimed in claim 1, where the heat-sensitive recording layer comprises at least one sensitizer, wherein the at least one sensitizer has a melting point in the range from 60° C. to 180° C., and/or where the at least one sensitizer is selected from the group consisting of 1,2-bis(3-methylphenoxy)ethane, 1,2-diphenoxyethane, 1,2-di(m-methylphenoxy)ethane, 2-(2H-benzotriazol-2-yl)-p-cresol, 2,2'-bis(4-methoxyphenoxy)diethyl ether, 4,4'-diallyloxydiphenyl sulfone, 4-acetylacetophenone, 4-benzylbiphenyl, acetoacetanilides, benzyl 2-naphthyl ether, benzyl naphthyl ether, benzyl 4-(benzyloxy)benzoate, benzylparaben, bis(4-chlorobenzyl) oxalate, bis(4-methoxyphenyl) ether, dibenzyl oxalate, dibenzyl terephthalate, dimethyl terephthalate, dimethyl sulfone, diphenyl adipate, diphenyl sulfone, ethylenebisstearamide, fatty acid anilides, m-terphenyl, N-hydroxymethylstearamide, N-methylolstearamide, N-stearylurea, N-stearylstearamide, p-benzylbiphenyl, phenyl benzenesulfonate, salicylanilide, stearamide, α,α'-diphenoxyxylene, and mixtures thereof.

11. The heat-sensitive recording material as claimed in claim 1 which can be used as entry tickets, flight, rail, ship or bus ticket, gaming ticket, carpark ticket, label, till receipt, bank statement, self-adhesive label, medical diagram paper, fax paper, security paper, or barcode labels.

12. The heat-sensitive recording material as claimed in claim 1, where the crystalline form of the compound of the formula II in the IR spectrum has an absorption band at $3401\pm20\ cm^{-1}$, and/or the compound of the formula I comprises a crystalline form or where the compound of the formula I is present in a crystalline form, where the crystalline form of the compound of the formula I has a melting point in the range of at least one of 195° C. to 217° C. and 200° C. to 215° C., determined as by differential thermal analysis.

13. The heat-sensitive recording material as claimed in claim 1, where the mass ratio between the compound of the formula II and the compound of formula I is in the range from ≥95:5 to ≤98:2.

14. A method for producing a heat-sensitive recording material, as claimed in claim 1, at least comprising the following steps:

i. providing or producing a carrier substrate;

ii. providing or producing a coating composition comprising a compound of the formula I and a compound of the formula II which comprises a crystalline form or where the compound of the formula II is present in a crystalline form, where the crystalline form of the compound of the formula II in the IR spectrum has an absorption band at $3401\pm20\ cm^{-1}$, and/or the compound of the formula I comprises a crystalline form or where the compound of the formula I is present in a crystalline form, where the crystalline form of the compound of the formula I has a melting point in the range of from at least one of 195° C. to 217° C., and 200° C. to 215° C., as determined by differential thermal analysis;

iii. applying the coating composition provided or produced in step ii. to the carrier substrate or to an interlayer disposed on the carrier substrate;

iv. drying the applied coating composition to form a heat-sensitive recording layer.

* * * * *